United States Patent [19]
Bordogna et al.

[11] Patent Number: 6,081,503
[45] Date of Patent: Jun. 27, 2000

[54] CONTROL ARCHITECTURE USING AN EMBEDDED SIGNAL STATUS PROTOCOL

[75] Inventors: Mark Aldo Bordogna, North Andover, Mass.; Philip Sidney Dietz, East Hampstead, N.H.; Joseph Elide Landry, Atkinson, N.H.; Jeffrey Robert Towne, Litchfield, N.H.; Warren Clifton Trested Jr., E. Hampstead, N.H.

[73] Assignee: Lucent Technologies Inc., Murray Hill, Del.

[21] Appl. No.: 08/942,095

[22] Filed: Oct. 1, 1997

[51] Int. Cl.[7] .................................................. H04L 12/56
[52] U.S. Cl. ........................... 370/222; 370/242; 370/248
[58] Field of Search ..................................... 370/222, 223, 370/224, 244, 242, 248; 340/825.01

[56] References Cited

U.S. PATENT DOCUMENTS

| | | | |
|---|---|---|---|
| 4,847,877 | 7/1989 | Besseyre | 375/368 |
| 5,008,882 | 4/1991 | Peterson et al. | 370/406 |
| 5,465,256 | 11/1995 | Fowler | 370/522 |
| 5,636,203 | 6/1997 | Shah | 370/244 |
| 5,838,684 | 11/1998 | Wicki et al. | 370/416 |

*Primary Examiner*—Hassan Kizou
*Assistant Examiner*—Mitchell Slavitt
*Attorney, Agent, or Firm*—Gregory J. Murgia

[57] ABSTRACT

A network element with a centralized switch fabric is able to support multiple switching functions while meeting established performance requirements by using a control system based on an embedded signal status protocol. Generally, each input signal within a transmission path is monitored to derive signal status information, which is then individually encoded and embedded within the input signal. The embedded signal status can be decoded and provided as input to control logic for processing at any point within the transmission path, as necessary. In the case of a centralized switch fabric, the control logic resolves an address of a single input signal based on the embedded signal status and provides this resolved address to the switch fabric so that the appropriate input signal can be selected. In the present invention, the control logic may be configured to support any given application, e.g., "path-in-line" protection switching, whereby each configuration of control logic constitutes an application control set that supports the performance requirements of that given application.

19 Claims, 4 Drawing Sheets

CONTROL ARCHITECTURE USING AN EMBEDDED SIGNAL STATUS PROTOCOL

CROSS REFERENCES TO RELATED APPLICATIONS

U.S. patent application Ser. No. 08/942,096, entitled "A Control Architecture for a Homogeneous Routing Structure" was filed concurrently herewith.

FIELD OF THE INVENTION

This invention relates generally to digital transmission networks, and, more particularly, to embedded control of routing structures, such as switch fabrics used in network elements.

BACKGROUND OF THE INVENTION

Digital transmission networks, such as those based on Synchronous Optical Network/Synchronous Digital Hierarchy (SONET/SDH) standards, are used extensively for transporting broadband communications signals. Network elements, such as multiplexers, digital cross-connect systems, and the like, are used in these transmission networks to support a number of different applications, including some that involve multiple switching or routing functions. It is to be understood that the terms "switching", "routing", "selecting" and "connecting" are used herein interchangeably to refer to the handling of signals within a transmission path. One example of an application with multiple switching functions is "path-in-line" protection switching, also referred to as "virtual rings" or "ring-on-ring", which involves line switching over bi-directional line switched rings (BLSR) and path switching over unidirectional path -switched rings (UPSR). To support these types of applications, some network elements include a routing structure, such as a switch fabric, to provide the necessary connections for switching signals through the transmission network for a given network application. A centralized switch fabric, i.e., a single, homogeneous switch fabric, is one example of a type of switch fabric that is commonly used.

Generally, the problems with prior art control arrangements for centralized switch fabrics relate to the complex coupling of control functions. Using digital transmission networks as an example, fault detection control for incoming input signals is typically based on signal status derived from signal monitoring in the port interface of a network element. In order to make appropriate selection decisions within the switch fabric based on signal status, the fault detection control functions associated with each of the monitored input signals must be coupled to the switch fabric control function. Some of the more notable problems with this configuration are inefficient and time consuming exchanges between the various control functions and switching delays as a result of the extensive coordination required between control functions. These problems are compounded when a switch fabric supports hundreds or thousands of input and output lines in a network element. In particular, the switch fabric control function must be coupled to the fault detection controls for each individual input signal, including signals from any previous selection points. Therefore, status of signals must be traced back to their respective input and resolved before another selection is made. This complex resolution process results in long analysis delays at each selection point, thereby decreasing the performance of the network element.

An alarm indication signal is used in some types of networks, e.g., SONET, for alerting downstream equipment that an upstream defect has been detected. However, an alarm indication signal is a separate maintenance signal and is not used to retain signal status, e.g., quality information, about a particular input signal. As such, an alarm indication signal is not used to propagate signal status through the network for individual input signals, and, as a result, signal status for each input signal must still be "rediscovered" at each subsequent switching point using some type of signal monitoring function. In addition, an alarm indication signal is not generated for all of the failure indicators used within SONET and is not structured to accommodate non-SONET signal status information. Given these limitations, a control arrangement based on an alarm indication signal-type scheme does not provide an effective means for resolving the status of signals transported through switching points.

SUMMARY OF THE INVENTION

A network element with a centralized switch fabric is able to support multiple switching functions while meeting established performance requirements by using a simple control system based on an embedded signal status protocol. Generally, each input signal within a transmission path is monitored to derive signal status information, which is then individually encoded and embedded within the input signal. The embedded signal status is decoded and provided as input to control logic for processing at any point within the transmission path, as necessary. In the case of a centralized switch fabric, the control logic resolves an address of a single input signal based on the embedded signal status and provides this resolved address to the switch fabric so that the appropriate input signal can be selected. In the present invention, the control logic may be configured to support any given application, e.g., "path-in-line" protection switching, whereby each configuration of control logic constitutes an application control set that supports the performance requirements of a particular application.

By encoding signal status for each of the input signals and applying this status to appropriate control logic within the application control set, control of the centralized switch fabric can be decoupled from other control functions within the network element. Moreover, because signal status propagates with each of the input signals, the signal status is locally available for each selection decision. As a result, no analysis is required to trace and resolve signal status through previous switch points. Control of the signal monitoring functions also becomes less complex in the present invention because the signal status does not have to be rediscovered at all switch points within the network element. In particular, the embedded signal status propagates through the various switch points after being determined by signal monitoring at the interface boundary and is directly extractable at any point within the transmission path.

The control system of the present invention also provides a wide range of status control whereby all presently known quality levels and failure conditions for transport signals can be mapped into in-line codes for encoding with the data stream of the input signals. Importantly, the protocol can also be expanded to accommodate any number of other failure and quality codes beyond those commonly used in the present systems. As such, the present invention provides a much wider range of status control than that provided in present systems, such as those using an AIS scheme.

BRIEF DESCRIPTION OF THE DRAWING

A more complete understanding of the present invention may be obtained by reading the following detailed description of the invention in conjunction with the appended drawing, with like elements referenced with like references, in which.

DETAILED DESCRIPTION OF THE INVENTION

It is well known that protection switching schemes are typically used in SONET/SDH networks so that communications can be maintained even if there are defects or failures on a given transmission path. Some examples of the types of network protection switching schemes used in SONET/SDH include: bi-directional line switched ring (BLSR), unidirectional path switched ring (UPSR), dual ring interworking (DRI), and 1+1 facility protection to name a few. Although the present invention is particularly well-suited for a "path-in-line" protection switching application in a SONET/SDH-based transmission network, and shall be described in the context of this application, those skilled in the art will understand from the teachings herein that the present invention can also be used in many other embedded control applications.

In the context of the following detailed description, the term "routing structure" is intended to encompass all the various components known in the art that are used for routing, switching, or connecting signals. One example of a routing structure is a switch fabric that is used in a network element for a digital transmission system. However, any type of signal interface that makes routing selections or decisions would be a suitable equivalent to the switch fabric. Therefore, the examples used throughout the detailed description are illustrative only and many other suitable routing structures may be used in conjunction with the present invention.

Figure 1A:
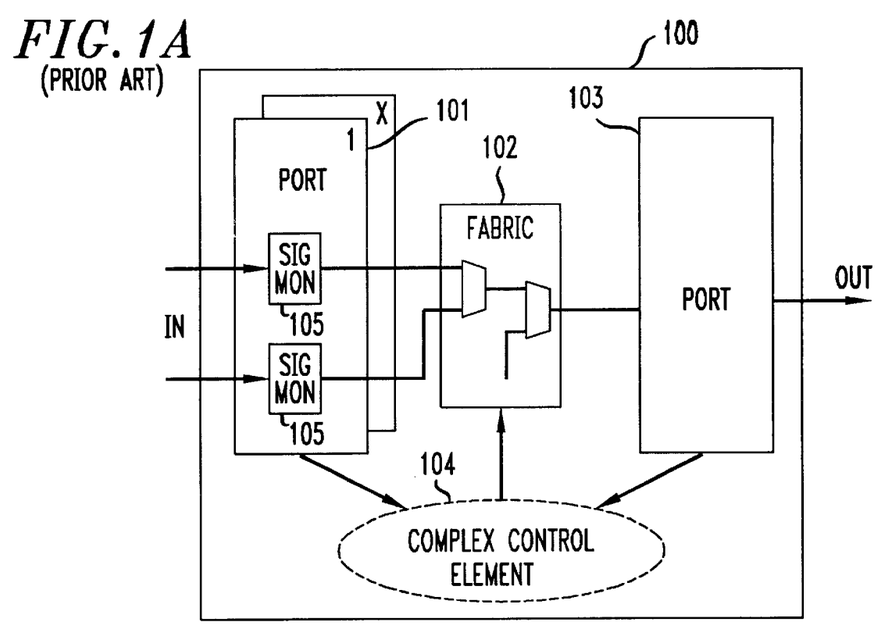
FIG. 1A shows in simplified form a typical prior art system for providing control to a switch fabric in a network element.

Network elements (NEs), such as digital cross-connect systems (DCS), typically include a number of port interfaces, one or more switch functions, and one or more control functions to implement a single switching application. As shown in FIG. 1A, a prior art network element 100 comprises port interfaces$_{1-x}$ 101 for receiving signals from the network, a switch fabric 102, port interface 103 for passing signals from switch fabric 102, and a complex control element 104 for controlling all port and switch functions within the network element. Port interfaces$_{1-x}$ 101 each typically includes a signal monitoring element 105 for monitoring the signal status of incoming signals. As previously described, prior art systems having this architecture have numerous disadvantages relating to the coupled control within complex control element 104 as well as the inability to propagate signal status information for incoming signals.

Figure 1B:
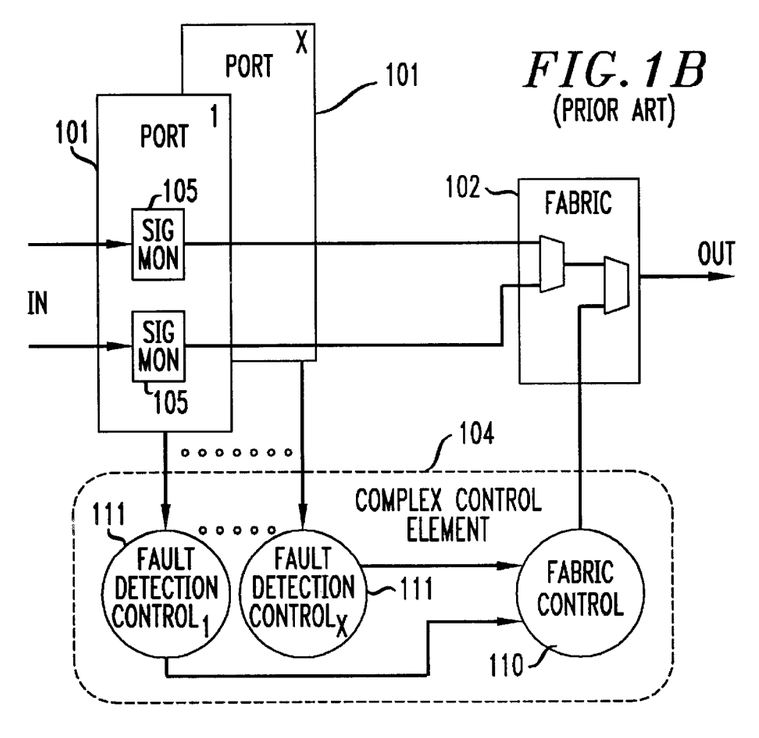
FIG. 1B shows a simplified block diagram of the control function shown in FIG. 1A.

FIG. 1B shows an expanded view of complex control element 104 from FIG. 1A, which could be used in a typical protection switching scheme. Complex control element 104 includes fabric control 110 as well as non-fabric controls such as fault detection controls$_{1-x}$ 111, wherein a fault detection control 111 is provided for each input signal 1 to x. In operation, a protection switching decision would not be made by fabric control 110 until signal status is resolved for each input signal via fault detection controls$_{1-x}$ 111. Fault detection controls$_{1-x}$ 111 are typically further coupled to the signal monitoring element 105 within port interfaces$_{1-x}$ 101. Therefore, complex control element 104 is fully coupled with respect to port interfaces$_{1-x}$ 101 and switch fabric 102 of network element 100. As previously described, prior art systems having this architecture have numerous disadvantages in terms of the extensive coordination required between the various control functions and the associated delays in selection decisions. In sum, present systems do not provide a performance-optimized control architecture that supports multiple switching and cross-connection functions for protection switching arrangements using a centralized switch fabric.

The present invention fills this need and others by incorporating an embedded signal status protocol in a control system for a centralized switch fabric. The embedded signal status protocol reduces the complexity of the control arrangement because multiple control functions do not have to be closely coupled to facilitate selection decisions. Generally, each input signal within a transmission path is monitored to derive signal status information, which is then individually encoded and embedded within the input signal. The embedded signal status is decoded and provided as input to control logic for processing at any point within the transmission path, as necessary. The control logic resolves an address for the single input signal that is to be selected from among all input signals based on the embedded signal status. In the case of a centralized switch fabric, the address resolved by the control logic would be used by the switch fabric to select the appropriate input signal corresponding to the resolved address. In the present invention, the control logic is configurable to support any given application, so that each configuration of control logic constitutes an application control set that supports the performance requirements of a particular application.

Figure 2:
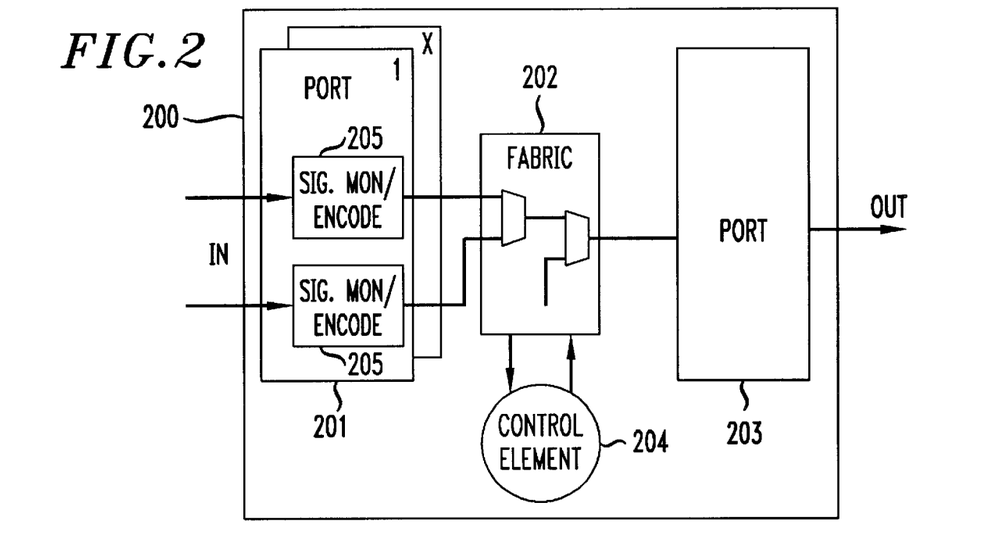
FIG. 2 is a simplified block diagram of a decouple control arrangement for a switch fabric according to the principles of the present invention.

FIG. 2 shows one illustrative embodiment of the present invention in the context of a network element used in digital transmission applications. As shown, network element 200 includes port interfaces$_{1-x}$ 201 for receiving signals from the network, a centralized switch fabric 202 implemented as the switch function, a port interface 203 for passing signals from switch fabric 202, and at least one decoupled control element 204 for controlling switch fabric 202. Port interfaces$_{1-x}$ 201 can include signal monitoring/encoding elements 205 for monitoring the incoming signals and encoding the status of the incoming signals. Port interfaces$_{1-x}$ 201 pass the signals along with the encoded status to switch fabric 202. Port interfaces 201 and 203 are therefore used to provide interface functions between switch fabric 202 and the various input and output signals. As shown, control element 204 is decoupled from port interfaces$_{1-x}$ 201 and 203 unlike the prior art arrangements. In the present invention, control element 204 is adapted to receive signal status information for each of the input signals and further adapted to provide a control input to switch fabric 202 to effect a selection decision. As will be described in further detail, the down arrow into control element 204 represents the signal status information, e.g., the quality information for incoming signals, and the up arrow from control element 204 represents the control input for the selection decision.

Switch fabric 202 is controlled locally in that only signal status information that is local to a particular selection function within fabric 202 is used to make the appropriate selection decision. This localized control is achieved in the present invention by using an embedded signal status, whereby signal status information is encoded along with the signal data for each of the inputs to switch fabric 202. Consequently, signal status information propagates through the network element along with the signal data and, as a result, a selection decision is made without having to trace back and resolve signal status for previously selected input signals.

Figure 3:
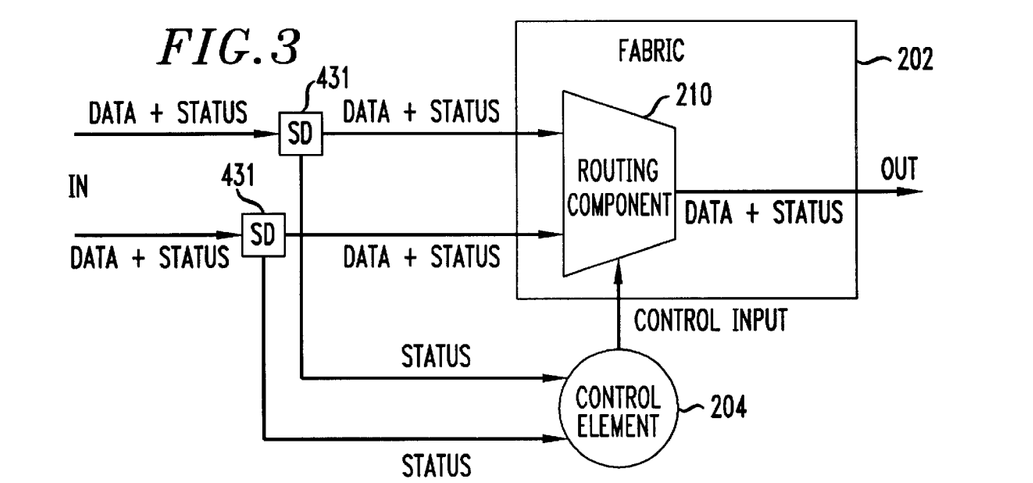
FIG. 3 shows a simplified flow diagram illustrating the exchange of signals between the control function and the switch fabric in the present invention.

FIG. 3 shows an expanded view of the functional signal flow between control element 204 and switch fabric 202. To promote clarity of presentation and understanding, FIG. 3 shows a single routing component 210 (e.g., selector 210) in switch fabric 202. However, it should be noted that many types of routing structures having complex hardware and/or software implementations are contemplated for realizing switch fabric 202. Examples could include an array of hardware selectors, link lists, as well as other implementations known to those skilled in the art. Referring again to FIG. 3, a status decoder (SD) 431 is provided at each input to selector 210 for locating the encoded status information carried within the respective input signal. As will be described in more detail, status decoder 431 decodes the encoded status information and passes the decoded status information on to control element 204. It should be noted that the encoded status of each input signal also propagates along with the input signal to selector 210. Control element 204 uses appropriate control logic to generate a control input signal to selector 210. The control input signal, shown by the up arrow from control element 204, includes the address of the particular input signal to be selected by selector 210 in switch fabric 202. In response to the control input signal, selector 210 switches out the appropriate output signal from fabric 202.

To provide the control input signal to switch fabric 202, control element 204 comprises control logic for resolving an address of a particular input signal based on the embedded signal status for each of the input signals. Control element 204 may include multiple stages of selectors and associated domain control elements selectively configured to resolve an address of a single input signal based on performance criteria for a particular application, such as "path-in-line" protection switching. U.S. patent application Ser. No. 08/942,096, entitled "A Control Architecture for a Homogeneous Routing Structure", which is incorporated herein by reference, describes one approach for implementing control element 204.

As will be described below, the embedded signal status information associated with each of the input signals is not removed during any of the control or switching operations, and as a result, signal status is preserved through the system. As compared with the prior art control arrangements, the embedded signal status protocol of the present invention eliminates the need to interface control element 204 with any type of fault detection control in the port interface. Thus, control of the switch fabric can be fully decoupled from other control functions.

Figure 4A:
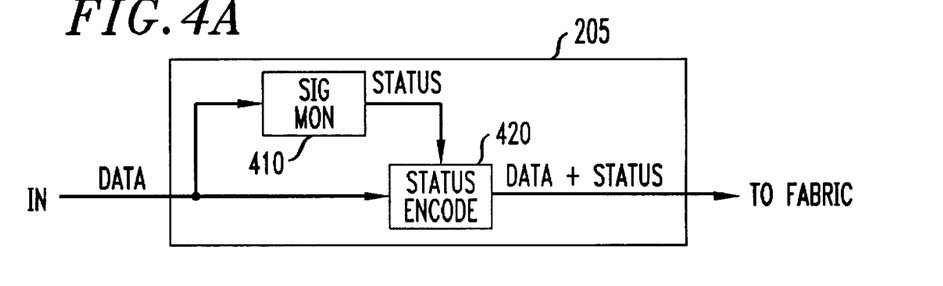
FIG. 4A shows a simplified functional block diagram of the embedded signal status protocol implementation in the present invention.
Figure 4B:
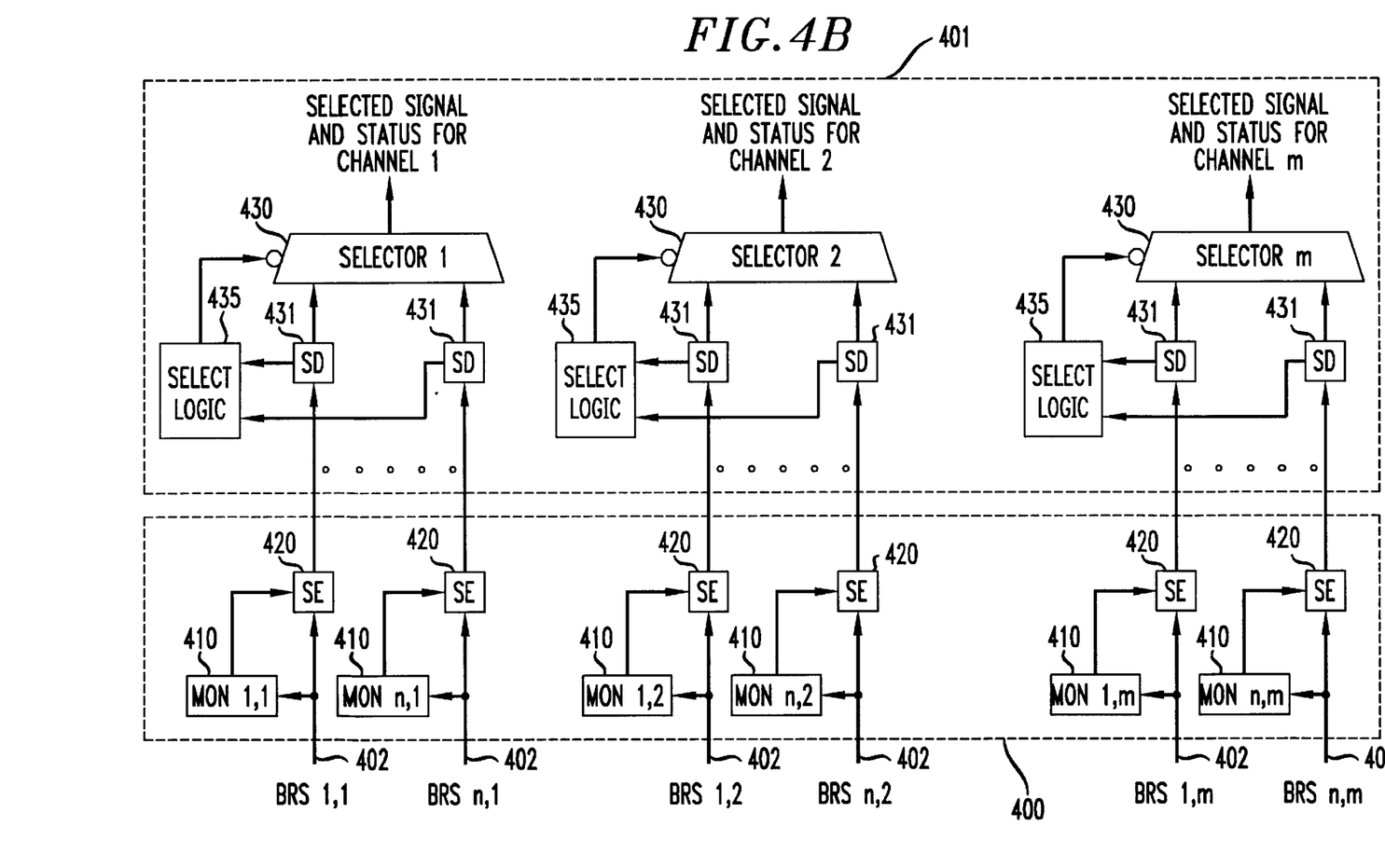
FIG. 4B shows an expanded view of a practical implementation of the embedded signal status protocol shown in FIG. 4A.

FIGS. 4A and 4B provide a more detailed illustration of the embedded signal status protocol of the present invention.

FIG. 4A is a simplified flow diagram showing how the signal status is embedded within the input signal. In general, an input signal is provided to both a signal monitoring element 410 and to a status encoding element 420 within signal monitoring/encoding element 205. Based on predetermined failure conditions or other performance criteria, signal monitoring element 410 outputs a signal status to status encoding element 420. Status encoding element 420 embeds the signal status information provided by signal monitoring element 410 and outputs the data from the input signal along with its embedded signal status information. Those skilled in the art will recognize that signal monitoring element 410 and status encoding element 420 can be implemented using techniques well known in the art.

Referring now to FIG. 4B, there is shown a more detailed illustration of the use of the embedded signal status protocol in the present invention. More specifically, FIG. 4B shows a signal interface portion 400 and a signal switch/selector portion 401. These blocks could be co-located in the same chassis or could be located in separate chassis. As compared with the embodiment shown in FIG. 2, signal interface portion 400 would include some of the functions of port interfaces 201 and signal switch/selector portion 401 would include some of the functions of switch fabric 202 and control element 204. Interface portion 400 is shown to receive m channels of n input signals, e.g., base-rate signals (BRS) 402, labeled as $BRS_{1,1}$ to $BRS_{n,m}$ where $BRS_{n,m}$ represents BRS n of channel m. As is well known, a base-rate signal is a signal of a fundamental rate or structure, which could also be combined with other similar base-rate signals to create a higher rate and/or more complex signal.

Within interface portion 400, each BRS 402 has an independent quality monitor 410, shown here as $MON_{1,1}$ to $MON_{n,m}$, where $MON_{n,m}$ represents quality monitor for BRS n of channel m. Quality monitor 410 is responsible for measuring the quality and or state of its respective BRS 402. Quality monitor 410 reports the BRS quality to a respective signal status encode function, shown here as status encoder (SE) 420, for the associated BRS 402. In the present invention, many different quality and/or status levels are available for encoding in status encoder 420. Stated otherwise, the embedded signal status protocol of the present invention supports a wide range of status control because many different status codes, each possibly representing a different status condition (e.g., quality, time-related parameters, etc.), may be encoded along with the signal. Status encoder 420 inserts an encoded value into the respective BRS 402, with the encoded value representing the quality or state of the respective BRS 402. From this point forward (within the architectural bounds of the system), BRS 402 now contains both its original data along with its encoded status. As such, the signal status propagates through the system, thereby eliminating the need to "rediscover" the signal status at any subsequent stage in the system. For example, for prior art systems, the signal would typically have to be monitored again at any subsequent input port to "rediscover" its signal status before the next selection decision could be made. Moreover, the present invention allows for monitoring at the interface boundary where the signal first enters the system as compared with prior art systems that require monitoring functions throughout the system and/or complex control structures to share information between control functions.

As shown, switch/selector portion 401 is an m-channel base-rate signal selector switch that includes m selectors 430 corresponding to m BRS channels. Each selector 430 selects from n BRS 402 inputs. The signal status decode function, implemented here as status decoder (SD) 431, is provided at each input to each selector 430 for locating the encoded status information carried within the respective BRS 402, for decoding the encoded status information if necessary, and for passing the decoded status information on to select logic 435. Select logic 435 evaluates the quality of all the inputs associated with selector 430 under its control and will command selector 430 to choose the most appropriate input. As compared with FIGS. 2 and 3, select logic 435 in FIG. 4B performs the equivalent tasks of control element 204. It should be noted that status decoder 431 does not remove the encoded status information from BRS 402, so that the output of each selector 430 contains the selected BRS 402 that includes the original BRS data for that signal along with the encoded status that was inserted at interface portion 400.

Since the encoded status information is transported with BRS 402 from input to output, this architecture assures that all switching decisions can be made locally at each switch/selector portion 401. Importantly, this architecture eliminates the need to share signal status information across functional portions using a complex (overlay) control structure. Moreover, this architecture directly supports multiple levels or stages of switching that can be either centralized or distributed.

Figure 5:
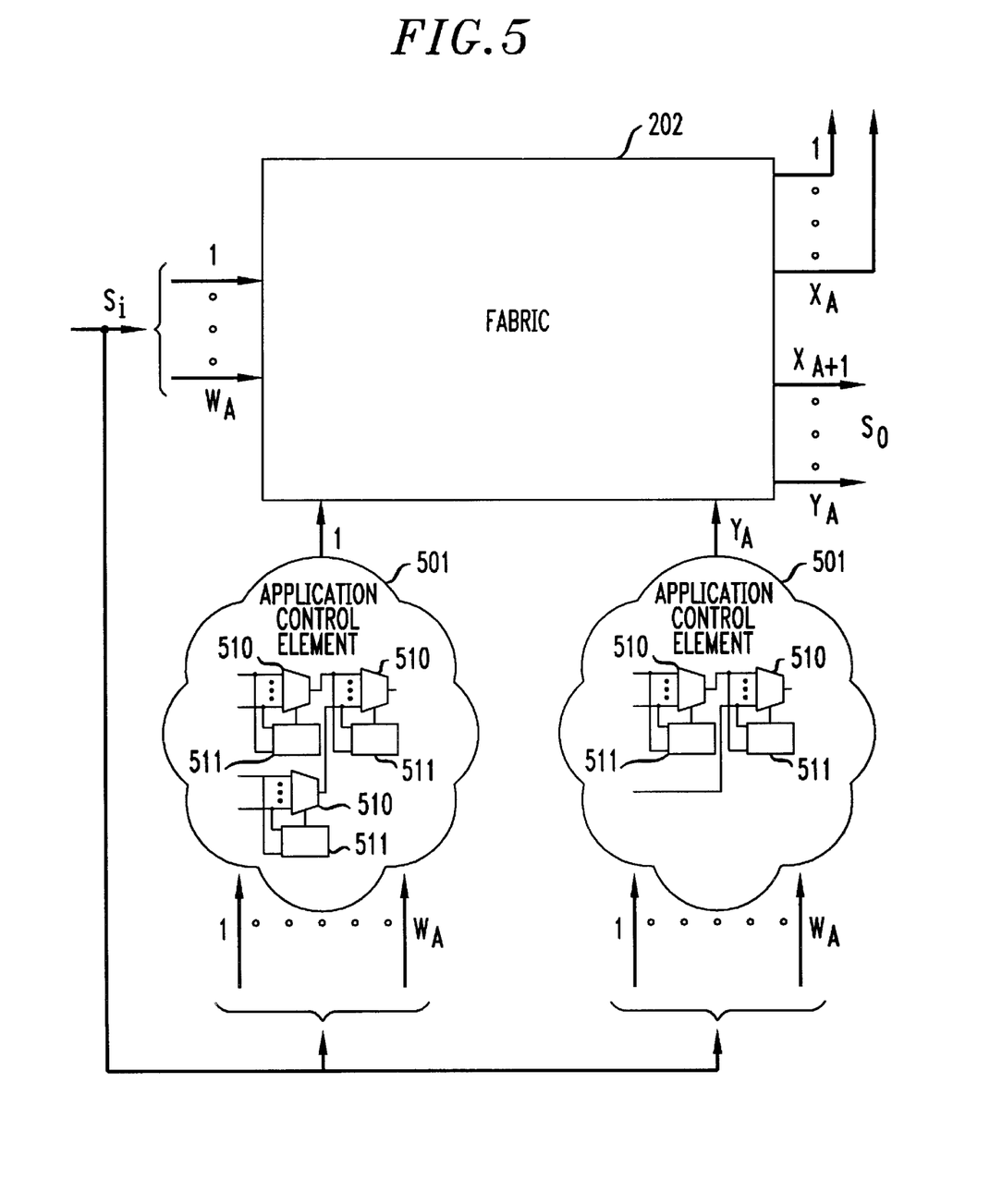
FIG. 5 depicts in simplified form one implementation of the multi-stage fabric control arrangement embodying the principles of the present invention.

As described, the embedded signal status protocol according to the principles of the present invention can be used for a centralized switch fabric that uses either a common control arrangement or a segmented control arrangement. For example, the embedded signal status protocol is well-suited for the segmented control arrangement described in U.S. patent application Ser. No. 08/942,096, entitled "A Control Architecture for a Homogeneous Routing Structure", incorporated herein by reference. As shown in FIG. 5, select logic 435 may be comprised of multi-stage, application specific address resolution functions 501. Each application specific address resolution function 501 includes control logic that can be selectively configured to resolve a single control input to switch fabric 202. More specifically, each application specific address resolution function 501 can include a number of logic stages selectively configured with an appropriate number and arrangement of selectors 510 and associated domain control functions 511.

For a segmented control application, switch fabric 202 receives a number of inputs $S_i$, represented as $1-W_A$ inputs, and generates a number of outputs $S_O$, represented as $1-Y_A$ outputs. Application specific address resolution functions 501 are coupled to switch fabric 202 with the number of application specific address resolution functions 501 being equal to the number of outputs $S_O$ so that each of the $1-Y_A$ control inputs to switch fabric 202 is independently mapped to one of the $1-Y_A$ outputs $S_O$. The address information and signal status information for each of the $1-W_A$ inputs is provided as input to the application specific address resolution functions 501. Application specific address resolution functions 501 are adapted to receive the address and signal status information from the $1-W_A$ inputs and are further adapted to perform selection functions to generate a single control input based on the signal status information. Typically, the single control input provided to switch fabric 202 would include the address of the input signal that is to be selected by switch fabric 202. Because each application specific address resolution function 501 is independent from each other, each application specific address resolution function 501 can be configured to provide "resolved" control of a single output $S_O$. In effect, switch fabric 202 is "channelized" because of the one for one association between application specific address resolution functions 501 and $1-Y_A$ outputs. As such, switch fabric 202 can simultaneously support $1-Y_A$ separate applications in parallel on a centralized switch fabric 202, because each "channel" of the switch fabric supports a separate application.

It will be understood that the particular embodiments described above are only illustrative of the principles of the present invention. Those skilled in the art may devise other suitable implementations without departing from the spirit and scope of the present invention for a number of other applications which may or may not be fabric-based telecommunications applications. For example, the present invention may be suitable for a sensor system used in automobiles or for an alarm/surveillance system that uses sensors placed at peripheral points along a data path that extends through a facility. Status from the sensors could be combined with the signal and propagated as necessary for appropriate use by a central processing point, such as a control center. Moreover, the signal status can be combined with the signal data in many different ways, such as by using a telemetry channel, or by modulating the amplitude, frequency, or phase of the signal data, to name a few. Additionally, the embedded signal status could be used for other than switching decisions. For example, the present invention could be used for fault isolation, identification and/or segmentation applications in which an embedded signal status is used to manage faults in a multi-span, serial transmission path. In general, any application that could benefit from using an embedded control mechanism would be a candidate for the present invention. Accordingly, the scope of the present invention is limited only by the claims that follow.

What is claimed is:

1. A system for providing control information derived from a plurality of input signals within a transmission path, the system comprising:

means for monitoring data in each of said plurality of input signals;

means for deriving signal status information for each of said plurality of input signals based on said monitored data;

means for individually encoding said signal status information for each of said plurality of input signals;

means for embedding said individually encoded signal status information with said data in each of said plurality of input signals;

means for decoding said individually encoded signal status information in each of said plurality of input signals; and means for actuating a control decision based on said decoded signal status information, wherein said individually encoded signal status information is retained in each of said plurality of input signals for propagation through said transmission path, and wherein said signal status information is directly extractable at any subsequent selection point within said transmission path.

2. The system of claim 1, wherein said individually encoded signal status information is capable of carrying a plurality of in-line status codes representing a combination of signal status parameters.

3. A system for controlling multiple selection functions in a transmission path, the transmission path adapted to receive a plurality of input signals and adapted to provide at least one output signal, the system comprising:

means for embedding signal status information within each of said input signals; and at least one application control set coupled to said transmission path, said at least one application control set responsive to said embedded signal status information transported with each of said plurality of input signals, said at least one application control set being adapted to receive said embedded signal status information as local input, said at least one application control set being operable to resolve a single control input signal based on said locally received embedded signal status information, wherein said embedded signal status information is capable of carrying a plurality of signal status codes, said control input signal including address information for one of said plurality of input signals, wherein said one of said plurality of input signals is selected in response to said control input signal, and wherein said control input signal is associated with said at least one output signal, and wherein said at least one application control set is operable to independently control one of said multiple selection functions in said transmission path via said associated control input signal and said at least one output signal.

4. The system of claim 3, wherein said means for embedding signal status information includes:

means for monitoring data in each of said plurality of input signals;

means for deriving said signal status information for each of said plurality of input signals based on said monitored data;

means for individually encoding said signal status information for each of said plurality of input signals; and means for combining said individually encoded signal status information with said data in each of said plurality of input signals, wherein said individually encoded signal status information is propagated through said transmission path along with said data in each of said plurality of input signals, wherein said individually encoded signal status information is directly extractable at any selection point within said transmission path.

5. The system of claim 3, wherein each said at least one application control set comprises a multi-stage application specific address resolution means, comprising:

at least one selector means; and at least one domain control means, coupled to said at least one selector means, for generating an appropriate control signal for said at least one selector means in response to said signal status information, said control signal including address information for a selected input signal, wherein said at least one selector means and said at least one domain control means are selectively configurable to support a single application.

6. In a network element having a routing component that supports multiple routing applications, said routing component adapted for selecting a plurality of output signals from among a plurality of input signals, a control system comprising:

means for embedding signal status information within each of said input signals; and a plurality of application control sets independently coupled to said routing component, said plurality of application control sets responsive to said embedded signal status information transported with each of said plurality of input signals, each of said plurality of application control sets being adapted to receive said embedded signal status information as local input, each of said plurality of application control sets including a control arbiter means for resolving a single control input signal for said routing component based on said embedded signal status information, wherein said embedded signal status information is capable of carrying a plurality of signal status codes, each of said control input signals including address information for one of said plurality of input signals;

wherein said routing component is responsive to each of said control input signals to select one of said plurality of input signals, and wherein each of said control input signals is associated on a one-to-one basis with one of said plurality of output signals so that said control input signals are equal in number to said plurality of output signals, each of said plurality of application control sets being operable to independently control one of said multiple routing applications in said routing component.

7. The system of claim 6, wherein each of said plurality of application control sets comprises a multi-stage application specific address resolution means, comprising:

a plurality of selector means coupled to each other in a specified configuration, said specified configuration including at least one application selection stage; and a plurality of individual domain control means selectively coupled to said plurality of selector means, said plurality of domain control means being operable to generate appropriate control signals for said plurality of selector means in response to said embedded signal status information, each of said control signals including address information for a selected input signal;

wherein an aggregation of said plurality of selector means and said plurality of domain control means in said specified configuration within said application specific address resolution means is selectively configurable to support a single application.

8. The system of claim 7, wherein said means for embedding signal status information includes:

means for monitoring data in each of said plurality of input signals;

means for deriving said signal status information for each of said plurality of input signals based on said monitored data;

means for individually encoding said signal status information for each of said plurality of input signals; and means for combining said individually encoded signal status information with said data in each of said plurality of input signals, wherein said individually encoded signal status information is propagated through said network element along with said data in each of said plurality of input signals, wherein said individually encoded signal status information is directly extractable at any selection point within and outside of said network element.

9. The system of claim 7, wherein said routing component comprises a switch fabric that supports multiple switching functions.

10. The system of claim 9, wherein said switch fabric supports path-in-line protection switching in a SONET-based digital transmission network.

11. The system of claim 10, wherein selected ones of said plurality of selector means are associated with a bidirectional line switched ring (BLSR) and selected ones of said plurality of domain control means associated with said BLSR selector means are operable to provide line switching control, and wherein other selected ones of said plurality of selector means are associated with a unidirectional path switched ring (UPSR) and other selected ones of said plurality of domain control means associated with said UPSR selector means are operable to provide path switching control.

12. A method for providing control information derived from a plurality of input signals within a transmission path, the method comprising the steps of:

monitoring data in each of said plurality of input signals;

deriving signal status information for each of said plurality of input signals based upon said monitoring;

individually encoding said signal status information for each of said plurality of input signals;

embedding said individually encoded signal status information with said data in each of said plurality of input signals;

decoding said individually encoded signal status information in each of said plurality of input signals; and actuating a control decision based on said decoded signal status information, wherein said individually encoded signal status information is retained in each of said plurality of input signals for propagation through said transmission path, and wherein said signal status information is directly extractable at any subsequent selection point within said transmission path.

13. A method for providing control information derived from a plurality of input signals within a transmission path, the method comprising the steps of:

monitoring data in each of said plurality of input signals;

deriving signal status information for each of said plurality of input signals based upon said monitoring;

individually encoding said signal status information for each of said plurality of input signals by mapping in-line status codes, wherein said individually encoded signal status information is capable of carrying a plurality of said in-line status codes representing a combination of signal status parameters;

embedding said individually encoded signal status information with said data in each of said plurality of input signals;

decoding said individually encoded signal status information in each of said plurality of input signals; and actuating a control decision based on said decoded signal status information, wherein said individually encoded signal status information is retained in each of said plurality of input signals for propagation through said transmission path, and wherein said signal status information is directly extractable at any subsequent selection point within said transmission path.

14. A method of controlling multiple routing applications in a routing component, the routing component adapted for selecting a plurality of output signals from among a plurality of input signals, the method comprising the steps of:

independently coupling a plurality of individual application control sets to said routing component;

embedding signal status information within each of said input signals;

providing said embedded signal status information as local input to each of said plurality of individual application control sets; and operating each of said plurality of individual application control sets to independently control one of said multiple routing applications in said routing component by resolving a single control input signal from each of said plurality of individual application control sets in response to said embedded signal status information, wherein said embedded signal status information is capable of carrying a plurality of signal status codes, wherein each of said control input signals includes address information for a particular input signal, and selecting one of said plurality of output signals from among said particular input signals, wherein each said control input signal corresponds on a one-to-one basis with one of said plurality of output signals.

15. The method of claim 14, wherein said embedding step includes the steps of:

monitoring data in each of said plurality of input signals;

deriving signal status information for each of said plurality of input signals based upon said monitoring;

individually encoding said signal status information for each of said plurality of input signals;

combining said individually encoded signal status information with said data in each of said plurality of input signals; and propagating said signal status information through said routing component, wherein said signal status information is directly extractable at any selection point within and outside of said routing component.

16. A system for controlling the selection of signals in a transmission path, the system comprising:

at least one signal monitor disposed along the transmission path for deriving signal status information for each of a plurality of signals, wherein the signal status information is representative of signal quality corresponding to each of the plurality of signals;

at least one signal status encoder coupled to the at least one signal monitor for embedding the corresponding signal status information in each of the plurality of signals;

at least one signal status decoder disposed along the transmission path for decoding the embedded signal status information corresponding to each of the plurality of signals; and a control element, responsive to decoded signal status information, for actuating a control decision to facilitate a selection decision based on signal quality, wherein the embedded signal status information is retained in each of the plurality of signals for propagation through the transmission path, and wherein the signal status information is directly extractable at any subsequent selection point within the transmission path.

17. The system of claim 16, wherein the embedded signal status information is capable of carrying a plurality of in-line status codes representing a combination of signal status parameters.

18. A method of controlling the selection of signals in a transmission path, the method comprising:

monitoring each of a plurality of signals to derive signal status information, wherein signal status information is representative of signal quality;

embedding the corresponding signal status information in each of the plurality of signals;

decoding the embedded signal status information corresponding to each of the plurality of signals; and actuating a control decision to facilitate a selection decision based on signal quality, wherein the embedded signal status information is retained in each of the plurality of signals for propagation through the transmission path, and wherein the signal status information is directly extractable at any subsequent selection point within the transmission path.

19. The method according to claim 18, wherein embedding comprises mapping in-line status codes, wherein the embedded signal status information is capable of carrying a plurality of the in-line status codes representing a combination of signal status parameters.

* * * * *